US011332571B2

(12) United States Patent
Dubey et al.

(10) Patent No.: US 11,332,571 B2
(45) Date of Patent: May 17, 2022

(54) EPOXY RESIN SYSTEM FOR STRUCTURAL COMPOSITES

(71) Applicant: ADITYA BIRLA CHEMICALS (THAILAND) LIMITED, Rayong (TH)

(72) Inventors: Pradip Kumar Dubey, Rayong (TH); Amit Dixit, Rayong (TH); Sirirat Changmongkol, Rayong (TH); Kanchana Inchamnan, Rayong (TH); Wasinee Sakathok, Rayong (TH)

(73) Assignee: ADITYA BIRLA CHEMICALS (THAILAND) LTD., Rayong (TH)

( * ) Notice: Subject to any disclaimer, the term of this patent is extended or adjusted under 35 U.S.C. 154(b) by 0 days.

(21) Appl. No.: 16/642,157

(22) PCT Filed: Sep. 14, 2018

(86) PCT No.: PCT/IB2018/057048
§ 371 (c)(1),
(2) Date: Feb. 26, 2020

(87) PCT Pub. No.: WO2019/053645
PCT Pub. Date: Mar. 21, 2019

(65) Prior Publication Data
US 2021/0070924 A1  Mar. 11, 2021

(30) Foreign Application Priority Data

Sep. 18, 2017 (IN) .............................. 201711032920

(51) Int. Cl.
*C08G 59/24* (2006.01)
*C08G 59/50* (2006.01)
*C08L 63/00* (2006.01)
*C08G 59/02* (2006.01)

(52) U.S. Cl.
CPC ......... *C08G 59/245* (2013.01); *C08G 59/025* (2013.01); *C08G 59/5006* (2013.01); *C08L 63/00* (2013.01)

(58) Field of Classification Search
CPC ...... C08G 59/22; C08G 59/226; C08G 59/24; C08G 59/245; C08G 59/50; C08G 59/5006; C08G 59/502; C08G 59/504; C08L 63/00; C09D 163/00; C09J 163/00

USPC .................................................. 523/427, 428
See application file for complete search history.

(56) References Cited

U.S. PATENT DOCUMENTS

| 6,359,075 B1* | 3/2002 | Wollum ................ C08F 297/04 525/314 |
| 6,482,894 B1* | 11/2002 | Chang .................. C08L 19/006 427/386 |
| 7,737,241 B2* | 6/2010 | Feng .......................... C09J 4/06 528/7 |
| 2005/0131195 A1 | 6/2005 | Asakage et al. |
| 2014/0256856 A1* | 9/2014 | Turakhia ................. C08L 63/00 523/456 |
| 2015/0274902 A1 | 10/2015 | Harshe et al. |

FOREIGN PATENT DOCUMENTS

| CN | 102702686 A | 10/2012 |
| CN | 104151780 A | 11/2014 |
| CN | 104610529 A | 5/2015 |
| JP | H0665476 A | 3/1994 |
| WO | WO-2012174989 A1 | 12/2012 |

OTHER PUBLICATIONS

Written Opinion of the International Searching Authority for International Application No. PCT/IB2018/057048, dated Jan. 10, 2019.
International Search Report for International Application No. PCT/IB2018/057048, dated Jan. 10, 2019.
Anonymous: "Advanced Materials: Araldite LY 1564/Aradur 3486/Aradur 3487 Warm curing epoxy system", URL: <HTTPS://www.swiss-composite.ch/pdf/t-Araldite-LY1564-Aradur3486-3487-e.pdf>, pp. 1-4, Jul. 25, 2012.

* cited by examiner

*Primary Examiner* — Michael J Feely
(74) *Attorney, Agent, or Firm* — Marshall, Gerstein & Borun LLP

(57) ABSTRACT

A slow reacting epoxy resin system is disclosed. The slow reacting epoxy resin system comprises a high purity epoxy resin component selected from the group comprising of a high purity Bisphenol A(BPA), a high purity Bisphenol F (BPF), and a combination thereof, and an amine curing agent. The initial viscosity after mixing the high purity epoxy resin component and the amine curing agent is less than 350 mPa·s at 25° C.

10 Claims, 2 Drawing Sheets

EPOXY RESIN SYSTEM FOR STRUCTURAL COMPOSITES

CROSS-REFERENCE TO RELATED APPLICATION

This is the United States national phase of International Patent Application No. PCT/162018/057048, filed Sep. 14, 2018, which application claims priority to India Patent Application No. 201711032920, filed Sep. 18, 2017. The entirety of each of the foregoing applications are hereby incorporated by reference.

FIELD OF THE INVENTION

The present disclosure relates to an epoxy resin system. Specifically, the disclosure relates to an epoxy resin system for structural composites.

BACKGROUND

Epoxy resins are a class of synthetic resins used extensively in structural composites applications. Epoxy resins offer a unique combination of properties that are unattainable with other thermoset resins. Due to the excellent physical and chemical properties in the industrial production, the epoxy resins have been widely used in adhesives, coatings, composite substrates, resin wind blades, and even aviation, space materials etc. Since 1980, epoxy resins are largely employed in composites and adhesives needed to produce wind rotor blades and other structural elements. The wind industry has quickly established itself as one of the largest composite applications of the world. Epoxy resin systems are preferred as matrix materials for high performance structural composites on account on their ease of processing, user friendliness and high mechanical strength and stiffness. For demanding applications such as wind turbine blades (which are one of the largest composite structures) made by infusion process, epoxy resins are widely used as they enable blades with exceptional fatigue behavior in both static and as well as dynamic loading conditions. In last, few years the wind energy industry has been growing exponentially with new blade designs being developed for higher MW (megawatt) ratings and subsequently longer length blades and rotor diameter. This has necessitated need for new epoxy resin systems which are slower in reactivity as these can provide long working time for controlled infusion process and reduce processing defects in manufacturing of rotor blades. Slow reacting infusion systems however increase the curing time and thus affect productivity due to increase in blade manufacturing cycle time.

Previous other attempts and development of suitable epoxy resin systems have also focused either on alternative chemistry and/or use of catalytic curing agent(s). Epoxy systems based on alternative chemistries have proved promising however, their compatibility with other blade materials and latency at ambient temperature are seen limiting and need validation for each design and process. Likewise, system based on catalytic curing agents are prone with issues like hot spots due to exothermic reaction temperature especially when handled in large masses.

Therefore, there is a need for an epoxy resin system that has desirable mechanical and performance properties suitable to for use in the wind blades.

SUMMARY OF THE INVENTION

The present disclosure relates to a slow reacting epoxy resin system. The slow reacting epoxy resin system comprises a high purity epoxy resin component selected from the group comprising of a high purity Bisphenol A(BPA), a high purity Bisphenol F (BPF), and a combination thereof, and an amine curing agent. The initial viscosity after mixing the high purity epoxy resin component and the amine curing agent is less than 350 mPa·s at 25° C.

DETAILED DESCRIPTION OF THE INVENTION

Figure 1:
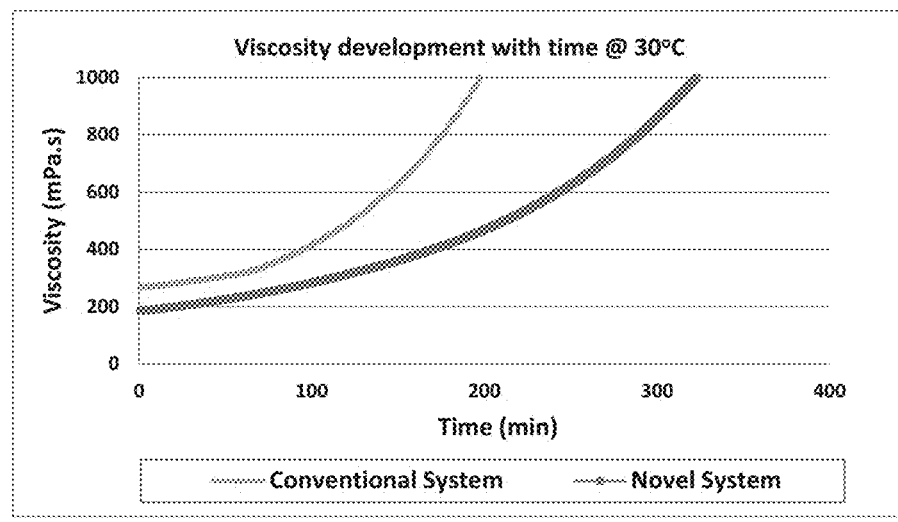
FIG. 1 illustrates viscosity development of an epoxy resin system in accordance with an embodiment of the present disclosure.

For the purpose of promoting an understanding of the principles of the invention, reference will now be made to embodiments and specific language will be used to describe the same. It will nevertheless be understood that no limitation of the scope of the invention is thereby intended, such alterations and further modifications in the disclosed process, and such further applications of the principles of the invention therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The present disclosure relates to a slow reacting epoxy resin system comprising a high purity epoxy resin component and an amine curing agent. The term "slow reacting epoxy resin system" in context of the present disclosure means a system in which the high purity epoxy resin component reacts slowly with the amine curing agent to form the epoxy resin system. In accordance with an aspect, the initial viscosity after mixing the high purity epoxy resin component and the amine curing agent is less than 350 mPa·s at 25° C. The term "initial viscosity" in context of the present disclosure means the viscosity measured immediately after mixing various components. Accordingly, the term "initial viscosity of the slow reacting epoxy resin system" in context of the present disclosure means the viscosity measured immediately after mixing the high purity epoxy resin component and the amine curing agent without any additives or additional components.

The high purity epoxy resin component comprises high purity Bisphenol A (BPA), high purity Bisphenol F (BPF) and a combination thereof. The viscosity of the high purity epoxy resin component is in the range of 800-8000 mPa·s.

The high purity epoxy resin component possesses high monomer content, low hydroxy value, and lower by-products and impurities, which results in slower reactivity when used in combination with the amine curing agent. The slow reactivity of the epoxy resin system of the present disclosure facilitates improved impregnation of reinforcement during composite processing by infusion process and contributes in elimination of process defects such as dry areas and wrinkles.

In accordance with an embodiment, the high purity epoxy resin component has by-products and impurities less than 5000 ppm. Said by-products and impurities may include compounds such as hydrolysable chlorine, alpha glycol, moisture and volatile organics, the concentration of the individual impurity being not more than 1000 ppm. The high purity epoxy resin component or the high purity Bisphenol A (BPA) and high purity Bisphenol F (BPF) can be obtained using known purification methods which includes filtration, and distillation. Alternately, any commercially available high purity Bisphenol A (BPA) or high purity Bisphenol F (BPF) can be used.

In accordance with an embodiment, the high purity Bisphenol A (BPA) has an epoxy equivalent weight (EEW) in a range of 171 to 183 gm/eq. In accordance with an embodiment, the high purity Bisphenol F (BPF) has an epoxy equivalent weight (EEW) of 155 to 165 gm/eq. The term "epoxy equivalent weight" in the context of the present disclosure means "the weight of resin in grams that contains one equivalent of epoxy".

In accordance with an embodiment, the high purity Bisphenol A (BPA) has a monomer content in a range of 85% to 99.9%.

In accordance with an embodiment, the high purity epoxy resin component comprises 60 to 90 wt. % of the high purity Bisphenol (A) (BPA) and 10 to 40 wt. % of the high purity Bisphenol F (BPF) of the total weight of the high purity epoxy resin component. In accordance with an embodiment, the high purity epoxy resin component comprises 70 to 80 wt. % of the high purity Bisphenol (A) (BPA) and 20 to 30 wt. % of the high purity Bisphenol F (BPF) of the total weight of the high purity epoxy resin component.

The slow reacting epoxy resin further comprises the amine curing agent. The amine curing agent can be selected from a group comprising aliphatic amines, cycloaliphatic amines, polyether amines, aromatic amines either modified or unmodified, and combination thereof. In accordance with an embodiment, the amine curing agent comprises a combination of at least two aliphatic amines. The aliphatic amines can be linear amines, branched amines and cyclic amines or their combinations. The amine curing agent comprises a combination of aliphatic amines having different functionalities. The aliphatic amines may be primary amines, secondary amines or tertiary amines having different amine hydrogen equivalent weights (AHEW). The term "amine hydrogen equivalent weight" in the context of the present disclosure means "the weight of the hardener in grams containing one equivalent of N—H groups". In accordance with an embodiment, the amine curing agent comprises one or more linear aliphatic amines, wherein a first linear aliphatic amine in a range of 72 to 100 wt. % and a second linear aliphatic amine in a range of 0 to 14 wt. % of the total weight of the amine curing agent. Examples of, the linear aliphatic amine include but are not limited to di and tri functional polyether amines having different molecular weights and ethylene amines. By way of specific examples, the first linear aliphatic amine curing agent are selected from one or more compounds having the formulas:

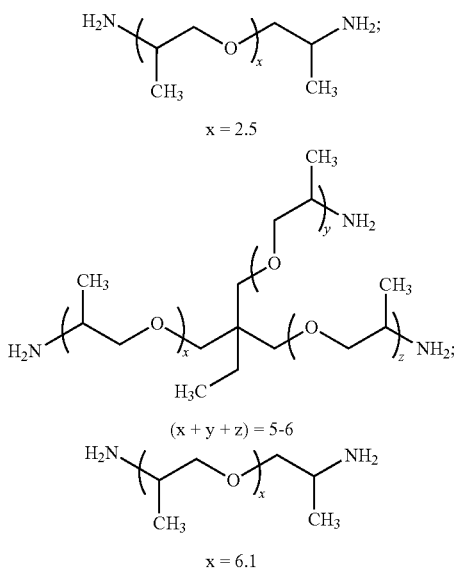

By way of specific examples, the second linear aliphatic amine curing agent are selected from the one or more compounds having the formulas:

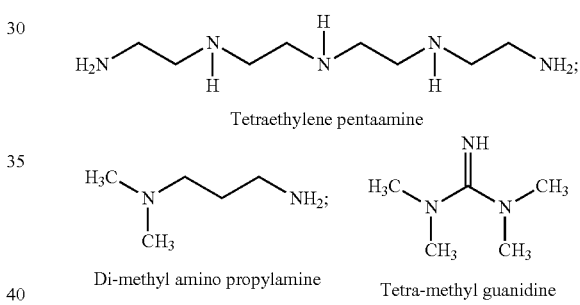

In accordance with an embodiment, the high purity epoxy resin component and the amine curing agent are added in a w/w ratio in a range of 100:10 to 100:50. In an example, the high purity epoxy resin component and the amine curing agent are added in a w/w ratio in a range of 100:25 to 100:35. The ratio of the high purity epoxy resin component and the amine curing agent in the epoxy resin system depends on the intended use and application of the epoxy resin system.

In accordance with an embodiment, the slow reacting epoxy resin system may further comprise additives. Said additives may be added as a separate component in addition to the high purity epoxy resin component and the amine curing agent. Alternatively, said additives form a part of the high purity epoxy resin component or form a part of the amine curing agent. In accordance with an embodiment, the total amount of additives in the epoxy resin system does not exceed 50 wt. % of the total weight of the epoxy resin system.

Additives include modifiers, diluents, latent curing agents, accelerators or combination thereof. The modifiers may be selected from defoamers, flow additives, rheological additives, fillers, air release additives, wetting agents and coupling agents. Diluents may be selected from mono-, di-, tri-functional aliphatic and aromatic epoxidized reactive diluents and non-reactive diluents.

The selection of said additives is based on attributes or characteristics required in the slow reacting epoxy resin system and the end use or the intended application of the slow reacting epoxy resin system.

For example, diluents may be added to the slow reacting epoxy resin system to further lower the "initial viscosity of the slow reacting epoxy resin system". These additives may be added to the slow reacting epoxy resin system to achieve initial viscosity even lower than 350 mPa·s. By way a specific example, addition of diluents and modifiers enables achieving an initial viscosity in the range of 150 to 250 mPa·s at 25° C. As herein refers to "initial viscosity" of slow reacting system means the viscosity measured immediately after mixing the high purity epoxy resin component, the amine curing agents and the additives.

By way of another example, the amine curing agent may further comprise one or more additives in accordance with intended application and purpose, such as for accelerating the cure speed. Examples of additives that may be added to the amine curing agent includes but are not limited to latent curing agent with secondary amines, tertiary amines, accelerators or other additives. In accordance with an embodiment, the additive added to the amine curing agent is an imidazole derivative. In accordance with an embodiment, the curing agent comprises additive in a range of 0 to 5 wt %.

The present disclosure also provides a method of preparing a slow reacting epoxy resin system. The method comprising mixing the high purity epoxy resin component as described above and the amine curing agent as described above. Any known method may be used to mix the high purity epoxy resin component and the amine curing agent, for example using magnetic stirrers, by hand mixing, mechanical mixing or other suitable mixing method.

The slow reacting epoxy resin system obtained in accordance with the present disclosure may be cured at room temperature. Alternately, for complete cross linking and attaining optimum mechanical properties, the epoxy resin system can be cured at elevated temperature. For heat curing, the epoxy resin system is subjected to heating at a predetermined temperature for a predetermined period of time.

In accordance with an embodiment, the slow reacting epoxy resin system, of the present disclosure can used as a structural composite wherein the strength development (Tg) is achieved in 4-6 hours having a pot life of 420-500 minutes.

The invention will now be described with respect to the following examples which do not limit the invention in any way and only exemplify the invention.

EXAMPLES

Example 1

Preparation of the High Purity Epoxy Resin Component Formulations and Curing Agent Formulations in Accordance with an Embodiment of the Present Disclosure.

TABLE 1

| | High purity epoxy resin component formulation | | | | | | |
|---|---|---|---|---|---|---|---|
| | High purity epoxy resin component formulation (wt %) | | | | | | |
| Composition | Conventional epoxy resin component formulation (wt %) | Epoxy resin component formulation A (wt. %) | Epoxy resin component formulation B (wt. %) | Epoxy resin component formulation C (wt. %) | Epoxy resin component formulation D (wt. %) | Epoxy resin component formulation E (wt. %) | Epoxy resin component formulation F (wt. %) |
| Standard BPA resin | 90 | — | — | — | — | — | — |
| High purity BPA | — | 75 | 73 | 76 | 75 | 74.7 | 75 |
| High purity BPF | — | 25 | 27 | 24 | 23 | 25 | 25 |
| Reactive diluent | 4 | — | — | — | 2 | — | — |
| Wetting agent | 6 | — | — | — | — | 0.3 | — |
| Total | 100 | 100 | 100 | 100 | 100 | 100 | 100 |

High purity epoxy resin component formulations A, B, C and F were prepared by mixing the high purity Bisphenol A (BPA) and the high purity Bisphenol F (BPF) in specific percentage as mentioned in Table 1 above at 25° C. The high purity epoxy resin component formulation D was prepared by mixing the high purity Bisphenol A (BPA) and the high purity Bisphenol F (BPF) in specific percentage along with reactive diluent in specific percentage as mentioned in Table 1 above at 25° C. The high purity epoxy resin component formulation E was prepared by mixing the high purity Bisphenol A (BPA) and the high purity Bisphenol F (BPF) in specific percentage along with wetting agent in specific percentage as mentioned in Table 1 above at 25° C.

A conventional epoxy resin system component was prepared by using standard Bisphenol A (BPA) resin, reactive diluent and wetting agent in specific percentage as mentioned above in table 1. The standard BPA has epoxy equivalent weight (EEW) in the range of 184 to 190 gm/eq. The conventional epoxy resin system is a typical epoxy resin infusion system currently used in the industry.

The properties of high purity Bisphenol A (BPA) used in preparation of formulations A, B, C, D, E and F in terms of monomer content, hydroxy value and impurities are provided below in Table 2.

TABLE 2

Properties of High purity Bis-phenol A (BPA) resin

| Properties | Range | Epoxy resin A | Epoxy resin B | Epoxy resin C | Epoxy resin D | Epoxy resin E | Epoxy resin F |
|---|---|---|---|---|---|---|---|
| EEW | 171-183 gm/eq | 174.2 | 171.4 | 173.4 | 171.8 | 175.1 | 174.1 |
| Monomers | 85-99.9% | 97.6 | 99.2 | 98.8 | 99.7 | 96.4 | 97.4 |
| Hydroxy value | <1000 mgKOH/g | 390 | 320 | 350 | 310 | 410 | 350 |
| Impurity | <5000 ppm | 3,700 | 1,500 | 2,500 | 1,000 | 4,000 | 2900 |

The properties of high purity Bisphenol F(BPF) used in preparation of formulations A, B, C, D, E and F in terms of Epoxy equivalent weight (EEW), hydroxy value and impurities are given in Table 3 below.

TABLE 3

Properties of High purity Bis-phenol F resin

| Properties | Range | Epoxy resin A | Epoxy resin B | Epoxy resin C | Epoxy resin D | Epoxy resin E | Epoxy resin F |
|---|---|---|---|---|---|---|---|
| Epoxy equivalent weight (EEW) | 155-165 gm/eq | 159.7 | 158.8 | 156.3 | 158.2 | 159.5 | 157.0 |
| Hydroxy value | <1000 mgKOH/g | 470 | 410 | 350 | 400 | 450 | 400 |
| Impurity | <5000 ppm | 4,200 | 3,200 | 1,020 | 2,900 | 4,000 | 3,100 |

The curing agent formulations A, B, C, D and E were prepared by mixing the first linear aliphatic amine and the second linear aliphatic amine in specific percentage as mentioned below in table 4 at 25° C. The curing agent formulation F was prepared by using the first linear aliphatic amine in specific percentage as mentioned above in Table 4 at 25° C.

The conventional hardener component formulation was prepared by mixing the first linear aliphatic amine and the cycloaliphatic amine in specific percentage as mentioned below in Table 4.

Product characterization: Process and performance properties of the slow reacting epoxy resin system was conducted by standard methods.

Table 5 below provides the processing properties including initial viscosity, glass transition temperature, pot life of 1 Kg mix at 25° C. and rise in viscosity up to 1000 mPa·s at 30° C. of the various slow reacting epoxy resin systems 1, 2, 3, 4, 5 and 6 prepared by mixing the high purity epoxy resin component and the curing agent described in Table 1 and Table 4 respectively. As it can be observed from the table 5, the initial viscosity of the slow reacting epoxy resin

TABLE 4

Curing agent formulations:

| Composition | Conventional hardener component formulation (wt %) | Curing agent formulation A | Curing agent formulation B | Curing agent formulation C | Curing agent formulation D | Curing agent formulation E | Curing agent formulation F |
|---|---|---|---|---|---|---|---|
| Linear aliphatic amine 1 | 23 | 32 | 28 | 32 | 31 | 32 | 37 |
| Linear aliphatic amine 2 | — | 1 | 2 | 2 | 1 | 1 | 0 |
| Cycloaliphatic amine | 10 | — | — | — | — | — | — |
| Total | 33 | 33 | 30 | 34 | 32 | 33 | 37 |

The Epoxy Resin System Preparation: Slow reacting epoxy resin systems 1, 2, 3, 4, 5 and 6 prepared by mixing the high purity epoxy resin component and the curing agent described in Table 1 and Table 4 respectively. The high purity epoxy resin component and the curing agent were mixed at 25° C. in a ratio of 100:33-37 (w/w). The slow reacting epoxy resin was shaped to be a desired specimen and was cured at 80° C. for 8 hrs. to determine the properties thereof.

systems 1, 2, 3, and 6 is less than 350 mPa·s even without the use of additional components such as diluents and modifiers vis-à-vis the conventional epoxy resin system where initial viscosity of 257 mPa·s is achieved only by using additional components such as diluents and modifiers.

TABLE 5

Processing Properties of the epoxy resin system

| Processing Properties | Test method | Unit | Conventional epoxy resin system | Epoxy resin System 1 | Epoxy resin System 2 | Epoxy resin System 3 | Epoxy resin System 4 | Epoxy resin System 5 | Epoxy resin system 6 |
|---|---|---|---|---|---|---|---|---|---|
| Initial viscosity | ASTM D 2196 | mPa · s | 257.9 | 208.0 | 213.4 | 235.4 | 195.8 | 211.5 | 183.5 |
| Glass transition temperature | ISO 11357 | °C. | 86.45 | 76.87 | 82.00 | 91.01 | 76.12 | 76.35 | 74.16 |
| Pot life, 1 kg mix @ 25° C. | ASTM D 2471 | Minutes | 322.0 | 383.0 | 471.0 | 437.0 | 488.0 | 365.0 | 474.0 |
| Rise in viscosity up to 1000 mPa · s @ 30° C. | ISO 3219 | Minutes | 198.0 | 295.5 | 306.0 | 269.0 | 314.5 | 289.7 | 304.0 |

"Initial viscosity" means the viscosity of the slow reacting epoxy resin system measured at the time of mixing the high purity epoxy resin component and the curing agent, at 25° C. The unit of viscosity is mPa·s.

"Glass transition temperature" means the temperature range where the slow reacting epoxy resin system changes from a hard, rigid or "glassy" state to a "rubbery" state. The unit of the glass transition temperature is ° C.

"Working life" means the working time or the length of time that the slow reacting epoxy resin system retains a viscosity low enough to be used in processing. Pot life helps to understand and estimate the working time of the slow reacting epoxy resin system during processing of the material.

The viscosity of the slow reacting epoxy resin system 2 prepared in accordance with the present disclosure and the conventional epoxy resin system was measured at different time intervals. Table 6 below provides the rise in viscosity up to 1000 mPa·s at 30° C. of the slow reacting epoxy resin system 2 prepared in accordance with the present disclosure and the conventional epoxy system. FIG. 1 illustrates that the rate of change of viscosity at 30° C. of the slow reacting epoxy resin system 2, in accordance with the present disclosure and the conventional epoxy system. As it can be observed from table 6 and FIG. 1, the viscosity of the slow reacting epoxy resin system 2 increases gradually as compared to the conventional epoxy system.

Figure 2:
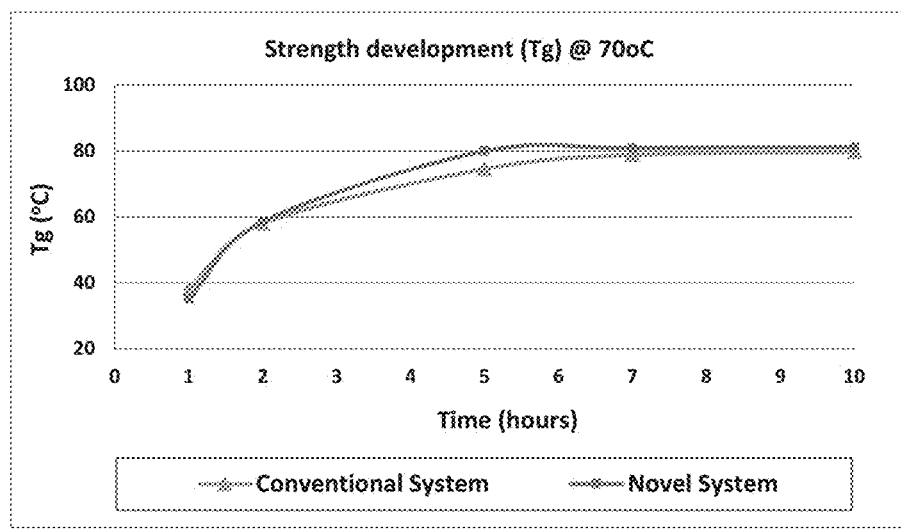
FIG. 2 illustrates strength development of an epoxy resin system in accordance with an embodiment of the present disclosure.

Further, the strength development of the slow reacting epoxy resin system 2 was measured by post curing isothermally @ 70° C. and observing the Tg value every 1 hr. Table 6 below provides the strength development (Tg) of the slow reacting epoxy resin system 2 in accordance with the present disclosure and the conventional epoxy system. FIG. 2 illustrates the strength development (Tg) of the slow reacting epoxy resin system 2, in accordance with the present disclosure, and the conventional epoxy system. As it can be observed from table 6 and FIG. 2, the slow reacting epoxy resin system 2 in accordance with the present disclosure attains the optimum strength development (Tg) @ 70° C. (required for complete cross-linking and attaining optimum mechanical properties) in 5 hr. The strength development of the slow reacting epoxy resin system 2 indicate comparable strength development in comparison with conventional epoxy systems having faster reactivity. This feature contributes in unchanged cycle time and thus does not impact productivity in composite part manufacturing.

Figure 3:
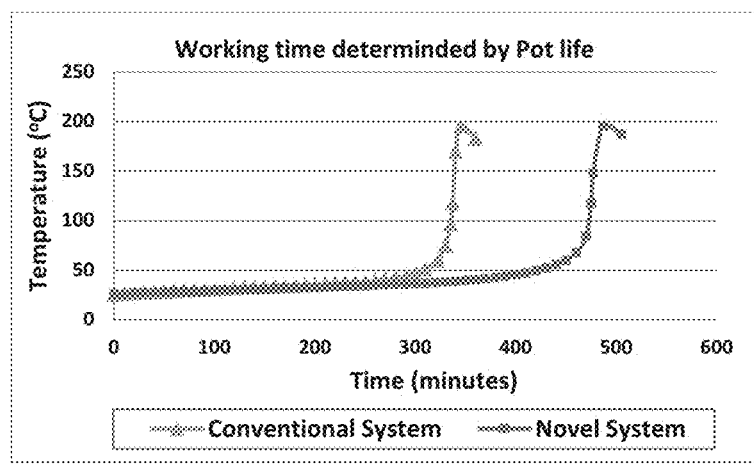
FIG. 3 illustrates working time of the epoxy resin system in accordance with an embodiment of the present disclosure.

In addition, the working time of slow reacting epoxy resin system 2 and the conventional epoxy system is determined by the pot life of the epoxy resin system. Table 6 below also provides the working time of the slow reacting epoxy resin system 2 in accordance with the present disclosure and the conventional epoxy system. FIG. 3 illustrates the working time of the slow reacting epoxy resin system 2 in accordance with the present disclosure and the conventional epoxy system. As it can be observed from table 6, the working time of the slow reacting epoxy resin system 2 in accordance with the present disclosure is 471 minutes and of the conventional epoxy system is 322.5 minutes.

TABLE 6

Strength Development of the epoxy resin system

| Properties | Unit | Conventional System | Novel System (Epoxy resin system 2) |
|---|---|---|---|
| Viscosity development with time @ 30°C. | | | |
| Time to reach 1,000 m · Pas | minutes | 198.0 | 306.0 |
| Strength development (Tg) @ 70°C. | | | |
| 1 hr. | °C. | 38.31 | 35.20 |
| 2 hrs. | | 58.10 | 58.56 |
| 5 hrs. | | 74.59 | 79.96 |
| 7 hrs. | | 78.87 | 80.90 |
| 10 hrs. | | 79.77 | 81.19 |
| Working time determined by pot life | | | |
| Time to reach 60° C. | minutes | 322.5 | 471.0 |

Performance Properties of the Epoxy Resin System

Performance properties of the epoxy resin system are also measured. Table 7 illustrates the performance properties of the conventional epoxy system and epoxy resin systems 1, 2, 3, 4, 5 and 6

TABLE 4

Performance Properties of the epoxy resin system

| Performance Properties | Test method | Unit | Conventional epoxy resin system | Epoxy resin system 1 | Epoxy resin system 2 | Epoxy resin system 3 | Epoxy resin system 4 | Epoxy resin system 5 | Epoxy resin system 6 |
|---|---|---|---|---|---|---|---|---|---|
| The epoxy resin system | | | | | | | | | |
| Tensile Test | ISO 527-2 | | | | | | | | |
| Tensile Strength | | MPa | 69.32 | 71.32 | 68.62 | 71.02 | 69.04 | 70.54 | 67.24 |
| Tensile Strain | | % | 4.73 | 4.62 | 4.42 | 5.05 | 5.23 | 4.82 | 5.41 |
| E-Modulus | | MPa | 2,790 | 2,923 | 2,902 | 2,865 | 2,841 | 2,822 | 2,731 |
| Flexural Test | ISO 178 | | | | | | | | |
| Flexural Strength | | MPa | 125.37 | 117.06 | 115.20 | 123.82 | 121.01 | 116.55 | 112.28 |
| Flexural Strain | | % | 6.23 | 5.95 | 5.74 | 6.37 | 6.34 | 5.49 | 6.79 |
| E-Modulus | | MPa | 3,083 | 3,091 | 3,038 | 3,076 | 3,003 | 3,079 | 2,812 |
| Fracture toughness | ISO 13586 | | | | | | | | |
| Critical stress intensity (K1c) | | MPa m$^{1/2}$ | 2.48 | 3.10 | 3.67 | 3.23 | 3.18 | 3.26 | 3.13 |
| Critical strain energy release rate (G1c) | | J/m$^2$ | 2.043 | 2,858 | 3,009 | 3,136 | 3,064 | 2,934 | 3,228 |
| Glass or carbon reinforced epoxy composite laminates | | | | | | | | | |
| Tensile test 90° (UD) | ISO 527-4 | | | | | | | | |
| Tensile strength | | MPa | 48.94 | 53.34 | 50.96 | 51.87 | 52.88 | 54.34 | 49.93 |
| Elongation at break | | % | 0.54 | 0.48 | 0.55 | 0.51 | 0.56 | 0.47 | 0.57 |
| Modulus (Chord 0.05%-0.25%) | | MPa | 10,407 | 11,275 | 11,022 | 10,541 | 10,156 | 11,776 | 9,315 |
| Compression test 90° (UD) | ISO 14126 | | | | | | | | |
| Compressive strength | | MPa | 146.48 | 148.51 | 152.15 | 166.2 | 146.48 | 147.03 | 144.60 |
| Compressive strain | | % | 1.32 | 1.57 | 1.84 | 1.91 | 1.52 | 1.59 | 1.86 |
| Compressive modulus | | MPa | 14,800 | 14,170 | 13,040 | 13,600 | 14,800 | 13,842 | 12,987 |
| Shear test ±45° 2Ax | ISO 14129 | | | | | | | | |
| Shear strength (at 5% shear strain) | | MPa | 35.63 | 38.98 | 40.17 | 42.57 | 39.33 | 42.76 | 38.02 |
| Shear modulus | | MPa | 2,860 | 3,234 | 3,400 | 3,273 | 3,327 | 3,484 | 3,180 |

Observations: The performance properties of the epoxy resin system indicate comparative strength development with the conventional epoxy resin system used for the manufacturing of wind turbine blades.

Specific Embodiments are Disclosed Below:

A slow reacting epoxy resin system comprising a high purity epoxy resin component selected from a group comprising of a high purity Bisphenol A (BPA), a high purity Bisphenol F (BPF), and a combination thereof, having viscosity in a range of 800-8000 m·Pas; and an amine curing agent, wherein the initial viscosity after mixing the high purity epoxy resin component and the amine curing agent is less than 350 m·Pas at 25° C.

Such epoxy resin system, wherein the high purity epoxy resin component comprises 60 to 90 wt. % of the high purity Bisphenol A (BPA) and 10 to 40 wt. % of the high purity Bisphenol F (BPF), of the total weight of the high purity epoxy resin component.

Such epoxy resin system, wherein the high purity epoxy resin component comprises 70 to 80 wt. % of the high purity Bisphenol A (BPA) and 20 to 30 wt. % of the high purity Bisphenol F (BPF) of the total weight of the high purity epoxy resin component.

Such epoxy resin system, wherein the high purity Bisphenol A (BPA) has an epoxy equivalent weight (EEW) in a range of 171 to 183 gm/eq.

Such epoxy resin system, wherein the high purity Bisphenol F (BPF) has an epoxy equivalent weight (EEW) in a range of 155 to 165 gm/eq.

Such epoxy resin system, wherein the high purity Bisphenol A (BPA) has a monomer content in a range of 85% to 99.9%.

Such epoxy resin system, wherein the high purity epoxy resin component has by products and impurities less than 5000 ppm.

Such epoxy resin system, wherein the amine curing agent is selected from a group comprising modified aliphatic amines, cycloaliphatic amines, polyether amine, aromatic amines and unmodified aliphatic amines, cycloaliphatic amines, polyether amine, aromatic amines and a combination thereof.

Such epoxy resin system, wherein the amine curing agent comprises one or more linear aliphatic amine.

Such epoxy resin system, wherein the amine curing agent comprises 72 to 100 wt. % of a first linear aliphatic amine and 0 to 14 wt. % of a second linear aliphatic amine of the total weight of the amine curing agent.

Such epoxy resin system, wherein the w/w ratio of the high purity epoxy resin component and the amine curing agent is in a range of 100:10 to 100:50.

Such epoxy resin system, wherein the w/w ratio of the high purity epoxy resin component and the amine curing agent is in a range of 100:25 to 100:35.

Such epoxy resin system further comprising additives selected from the group consisting of modifiers, diluents or combination thereof, wherein the initial viscosity of the epoxy resin system is in the range of 150 to 250 mPa·s.

Such epoxy resin system for use as structural composite, wherein the strength development (Tg) is achieved in 4-6 hrs having a pot life of 420-500 minutes.

INDUSTRIAL APPLICABILITY

The slow reacting epoxy resin system in accordance with the present disclosure possesses desirable processing and performance properties suitable for wide ranging composite processes such as infusion, wet lay-up, filament winding and pultrusion for applications in various structural composites including fiber reinforced composites. Examples of such composites include but not limited to aerodynamic wings, wind turbine blades, automobile components, sports & recreational composites, construction, electrical casting and insulation. The desirable properties include low initial viscosity, high cross-linking density and fast curing. The low viscosity of the slow reacting epoxy resin system provides a long working time for the epoxy resins to impregnate the glass or carbon fibers and provides high quality composite parts without dry spots, wrinkles and surface defects.

The slow reacting epoxy resin systems offer several advantages which include fast strength development, longer pot-life and good fiber wetting property. The processing and the performance properties, of the slow reacting epoxy resin system particularly in windmill application plays an important role in improving the efficiency of the windmill. The fast curing epoxy resin system of the present disclosure possess potential to improve productivity in blade manufacturing. The epoxy resin system of the present disclosure allows manufacturing of longer and higher megawatt rating blades. The slow reacting epoxy resin system in accordance with the present disclosure offers a unique solution as it meets the blade designer's need for new materials for aerodynamic-longer-higher power rating blades as well as the blade manufacturer's cost targets by serving to reduce manufacturing & process defects and increasing productivity.

We claim:

1. A slow reacting epoxy resin system comprising:
   a high purity epoxy resin component selected from a high purity Bisphenol A (BPA) epoxy resin, a high purity Bisphenol F (BPF) epoxy resin, and a combination thereof, wherein the high purity epoxy resin component comprises less than 5000 ppm of has by-products and impurities;
   an amine curing agent comprising a first linear aliphatic amine and a second linear aliphatic amine, wherein the first linear aliphatic amine is present in an amount of at least 72 wt. %, based on the total weight of the amine curing agent, and the second linear aliphatic amine, which is different from the first linear aliphatic amine, is present in an amount of at most 14 wt. %, based on the total weight of the amine curing agent, and
   optional additives selected from the group consisting of modifiers, diluents, and a combination thereof;
   wherein the initial viscosity after mixing the high purity epoxy resin component and the amine curing agent without the optional additives is less than 350 mPa·s at 25° C., as measured in accordance with ASTM D2196; wherein the initial viscosity after mixing the high purity epoxy resin component and the amine curing agent with the optional additives is from 150 to 250 mPa·s at 25° C., as measured in accordance with ASTM D2196; and wherein the viscosity of the slow reacting epoxy resin system reaches 1000 mPa·s at 30° C. after a period of greater than 198 minutes, as measured in accordance with ISO 3219.

2. A slow reacting epoxy resin system as claimed in claim 1, wherein the high purity epoxy resin component comprises 60 to 90 wt. % of the high purity Bisphenol A (BPA) epoxy resin and 10 to 40 wt. % of the high purity Bisphenol F (BPF) epoxy resin, totaling 100 wt. % of the high purity epoxy resin component.

3. A slow reacting epoxy resin system as claimed in claim 1, wherein the high purity epoxy resin component comprises 70 to 80 wt. % of the high purity Bisphenol A (BPA) epoxy resin and 20 to 30 wt. % of the high purity Bisphenol F (BPF) epoxy resin, totaling 100 wt. % of the high purity epoxy resin component.

4. A slow reacting epoxy resin system as claimed in claim 1, wherein the high purity Bisphenol A (BPA) epoxy resin has an epoxy equivalent weight (EEW) in a range of 171 to 183 gm/eq.

5. A slow reacting epoxy resin system as claimed in claim 1, wherein the high purity Bisphenol F (BPF) epoxy resin has an epoxy equivalent weight (EEW) in a range of 155 to 165 gm/eq.

6. A slow reacting epoxy resin system as claimed in claim 1, wherein the high purity Bisphenol A (BPA) epoxy resin has a monomer content in a range of 85% to 99.9%.

7. A slow reacting epoxy resin system as claimed in claim 1, wherein the w/w ratio of the high purity epoxy resin component and the amine curing agent is in a range of 100:10 to 100:50.

8. A slow reacting epoxy resin system as claimed in claim 1, wherein the w/w ratio of the high purity epoxy resin component and the amine curing agent is in a range of 100:25 to 100:35.

9. A slow reacting epoxy resin system as claimed in claim 1, wherein the optional additives are present.

10. A slow reacting epoxy resin system as claimed in claim 1 having a pot life of 420-500 minutes, for use as structural composite wherein the optimum strength development (Tg) determined by post curing the slow reacting epoxy resin system isothermally at 70° C. and by observing the Tg every hr, is achieved in 4-6 hrs.

* * * * *